March 27, 1962 F. BARTH 3,026,785
PHOTOGRAPHIC INTRA-LENS SHUTTER
Filed Feb. 5, 1959 2 Sheets-Sheet 1
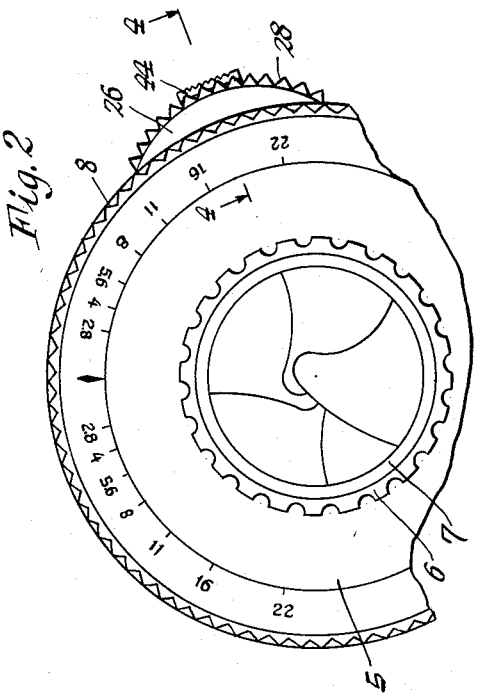
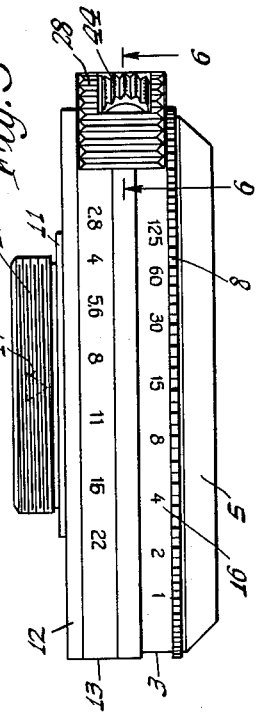
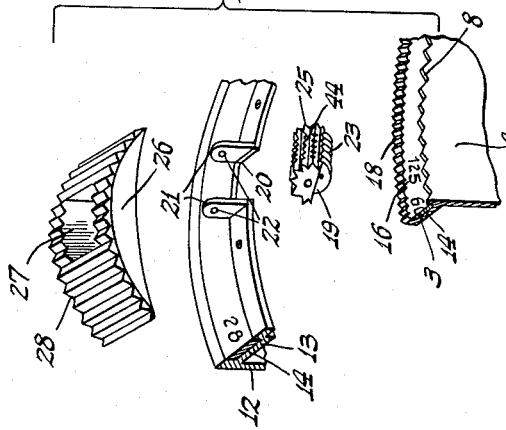
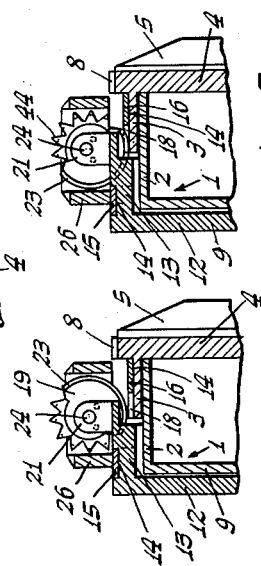
INVENTOR.
FRITZ BARTH
ANNELIESE BARTH, EXECUTRIX
BY
Munn, Liddy, Daniels & March
ATTORNEYS March 27, 1962 F. BARTH 3,026,785
PHOTOGRAPHIC INTRA-LENS SHUTTER
Filed Feb. 5, 1959 2 Sheets-Sheet 2
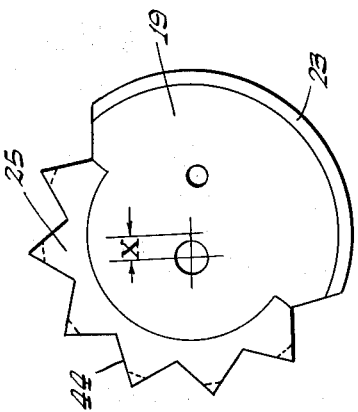
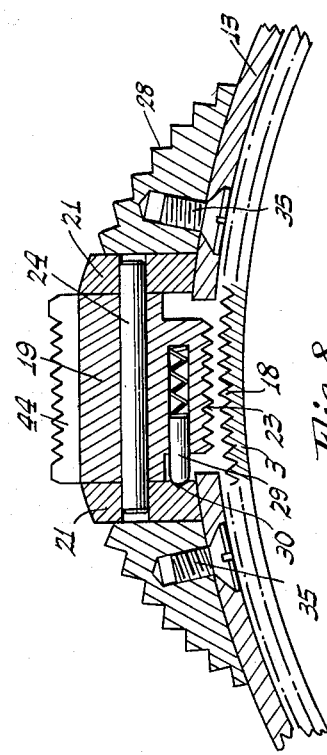
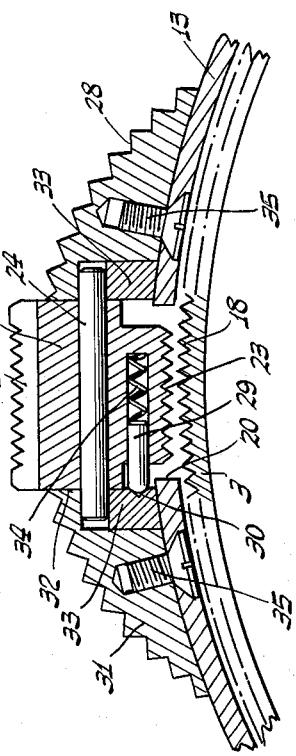
INVENTOR.
FRITZ BARTH
ANNELIESE BARTH, EXECUTRIX
BY
Munn, Liddy, Daniels & March
ATTORNEYS United States Patent Office 3,026,785
Patented Mar. 27, 1962

3,026,785
PHOTOGRAPHIC INTRA-LENS SHUTTER
Fritz Barth, deceased, late of Calmbach (Enz), Germany, by Anneliese Barth, widow and sole heir, Calmbach, Kreis Calw, Germany, assignor to Alfred Gouthier, G.m.b.H., Calmbach (Enz), Germany, a corporation of Germany
Filed Feb. 5, 1959, Ser. No. 791,495
5 Claims. (Cl. 95—64)

This invention relates to photographic intra-lens shutters of the type having releasable coupling means between speed and diaphragm setting rings which are co-axially arranged with respect to the shutter axis, and more particularly to intra-lens shutters of this type wherein the setting rings have associated parts or portions extending generally in circumferential directions and adjoining each other.

In the past many types of coupling devices have been proposed and produced, for releasably connecting the speed and diaphragm setting rings of a camera. Some currently-used devices intended for this purpose comprise a notched part connected with one of the setting rings, which notched part is cooperable with a spring-urged detent or locking member connected with the other setting ring. With such couplings, for the purpose of obtaining a secure connection which is not likely to slip or become accidentally released, the notched part of necessity has rectangular or square teeth which are engaged by a suitable locking claw on the spring-urged member. With this type of coupling device, because of the limited available space, the narrowness and characteristic proportions of the components and structures involved in intra-lens shutters and due further to technical reasons, it is not possible or feasible to sub-divide any interval or space between two adjoining scale designations into more than two or three sub-divisions. This is due to the fact that, if a greater number of sub-divisions were to be attempted it would not be possible to provide in a practical manner the required rectangular or square teeth with the cooperable claw member, associated with the setting rings and constituting the coupling means between them.

However, the limitations placed upon subdividing the scale intervals through the use of a notched coupling means as above identified, places undesired restrictions on the adjustment of the camera, by which all exposure conditions may not be satisfactorily met. With such notched coupling means it is not possible to exactly, or virtually exactly correlate the speed and diaphragm settings for all exposure values obtained by means of an exposure meter, and certain of such exposure values might at times be required in order to obtain the best possible exposure of the film. This is particularly true with films that have a small range of exposure, as for example in the case of color films. Moreover, with shutters which are equipped with such notched coupling devices and which further have a coupled exposure meter it is possible in only a few cases to bring the tracing indicator of the exposure meter into full coincidence with the measuring device indicator, and this is psychologically considered undesirable and distinctly disadvantageous.

Beside the well-known notch type speed-diaphragm coupling above mentioned, couplings which rely on friction between two relatively movable parts are also well known. Such friction-type couplings have an advantage over the notch-type since they provide for a stepless relative shifting between the setting members, thus enabling in all instances an exact relationship to be obtained in the speed-diaphragm proportion, as indicated by the exposure values of the exposure meter. However, such friction-type couplings have a disadvantage in that they are not as convenient to operate, and require more pains and effort in order to set them properly. Also, the manufacture of such friction couplings is more difficult, for the reason that the available space is usually not sufficient to properly execute the parts, requiring that such parts therefore be of reduced size and for this reason at times ineffective. Moreover, such frictional couplings are not positive in their locking action, and are subject to slippage whereby the relationship between the speed and diaphragm rings may be accidentally disturbed and rendered inaccurate.

It is further desirable, in the operation of a camera, to have both setting members remain normally uncoupled without the necessity of a positive act on the part of the user (as by employing a continual pressure or force to maintain such condition) since this provides the advantage of quick and easy operation of the setting members. This would be of special advantage when making flash exposures, where the speed setting generally remains constant, and where changes in the distance of the camera from the subject are adjusted by changing the setting of the diaphragm.

With certain well-known notched type couplings no arresting of the manually operable coupling member in its uncoupled position is possible; the provision of such arresting device would involve appreciable additional expense, and accordingly is dispensed with. With other well-known coupling devices where there is an arresting means for holding the coupling member in its uncoupled position there is the drawback that when the user of the camera actuates the associated setting member he may easily, accidentally release the coupling member so that unintentionally both setting rings would become coupled, interfering with the setting of the camera. The difficulties and drawbacks mentioned immediately above are found in connection with friction-couplings as well as with the notch-type. One object of the present invention is to provide a novel and improved coupling between co-axially arranged speed and diaphragm setting rings, which coupling obviates the above disadvantages and drawbacks.

Another object of the invention is to provide an improved coupling device as above set forth, which enables a relatively large number of virtually exact coupled relationships to be established between the speed and diaphragm setting members, thereby to effect a substantially exact speed-diaphragm proportion as required by the indicated exposure values of an exposure meter. A further object of the invention is to provide an improved coupling means as above characterized, which is simple in its construction, involving relatively few components of the type which may be readily manufactured, and which coupling means is therefore inexpensive to produce. Still another object of the invention is to provide an improved coupling means as set forth, which may be easily operated, even by an inexperienced user, and which is readily accessible to view and is furthermore extremely reliable in its operation and functioning. Yet another object of the invention is to provide an improved coupling means in accordance with the foregoing, which will remain in either its coupled or uncoupled condition without requiring continual pressure or force on the part of the user, while at the same time retaining simplicity of construction and low manufacturing cost.

The above objects are accomplished, in accordance with the invention, by the provision of inner and outer cylindrical mantles on the setting members, with fine gear teeth being provided on the exterial surface of the inner mantle and arranged to mesh with gear teeth on a coupling roller which is movable between engaged and disengaged positions. The said coupling roller is mounted on the outer cylindrical mantle which is associated with or carried by the other setting ring, and has its axis of rotation extending generally in a circumferential direction. Moreover, the said roller is shiftable between two stop positions or limits, and carries the fine gear teeth on a portion of its circumference.

An intra-lens shutter having a coupling device as provided by the invention, when compared with well-known notched type couplings has the great advantage that the speed and diaphragm scale intervals may be readily subdivided into more than two or three subdivisions. The actual small subdivisions which are obtainable by the present coupling device will be smaller than the error which would be introduced when making small inaccuracies in the reading of the exposure meter indicator member. Moreover, by virtue of the positive coupling which is effected between the threaded coupling roller and the fine-thread gearing or gear teeth associated therewith a secure non-slip connection is established between the two setting rings. Also, the operation of the coupling roller, as well as the separate shifting of one or both setting rings requires only little effort. Accordingly, the improved coupling means as provided by the invention is definitely superior to friction-type couplings also.

In addition, an intra-lens shutter having a coupling means as provided by the invention may be operated with the utmost convenience and facility, due to the fact that the coupling member can remain in either its coupled position or uncoupled position without the necessity for applying a continual pressure, and this convenience and structure which provides it is obtained without appreciably increasing the manufacturing cost or the complexity of the coupling.

An advantageous construction of coupling device in accordance with the invention, characterized by few and simple components, may be had by the provision of two radially directed bearing blocks on the setting ring which carries the coupling roller, said blocks having appropriately positioned bores arranged to support the roller for turning movement.

The coupling roller is supported and arranged so as to be accessible from the exterior of the intra-lens shutter, and for the purpose of preventing dirt and dust from getting into the interior of the shutter housing, and also to facilitate the operation of the roller the supporting means therefor may be advantageously covered by a cover part or member mounted on the cylindrical mantle of the setting member. The said cover part is provided with a recess which corresponds to the shape and size of the roller, so that the latter may be readily accommodated by it.

If the said cover part or cover member is provided with knurling on its exterior surface adjacent the roller as shown herein, this will tend to facilitate the actuation of the setting ring which carries the roller.

In another illustrated embodiment of the invention a different means is provided for supporting the coupling roller, the said means combining the functions of the cover member and bearing or mounting blocks. This embodiment has the advantage that a saving of time and work is effected, in the assembly of the coupling.

It is possible to insure at all times a secure and positive engagement of the cooperable teeth on the coupling roller and setting member by arranging the roller so that its axis of turning is eccentrically located with respect to the roller circumference. By such organization important advantages are obtained, not only with respect to mass production of the rollers but also since the rollers need not be held to especially close tolerances by virtue of their cooperable relationship with the associated components, including the coaxially arranged setting rings.

For the purpose of preventing inadvertent or unintentional shifting of the coupling roller, and to obtain clear and well defined positions thereof a notch or detent device may be readily incorporated in the roller structure, such detent device becoming operative when the roller reaches either of its two limits of movement.

Two embodiments of the invention are illustrated in the accompanying drawings. Those parts of the intra-lens shutter which form no part of the invention have been omitted for the sake of clarity of illustration.

FIGURE 1 is an exploded view, in perspective, of an improved coupling device as provided by the invention.

FIG. 2 is a fragmentary front elevational view of an intra-lens shutter having the coupling device of the invention incorporated therein.

FIG. 3 is a top view of the intra-lens shutter shown in FIG. 2, the cylindrical mantles of the coupled diaphragm and speed setting rings being shown in overlapping relation.

FIG. 4 is a fragmentary radial section through the coupling device, taken on the line 4—4 of FIG. 2. In this figure the diaphragm and speed setting rings are uncoupled and the coupling device is in its inoperative position.

FIG. 5 is a view like FIG. 4, but showing the coupling device in its operative position, whereby the diaphragm and speed setting rings are connected with each other for simultaneous movement.

FIG. 6 is a transverse fragmentary section, enlarged, taken on the line 6—6 of FIG. 3.

FIG. 7 is an end elevational view, enlarged, of the coupling roller as provided by the invention.

FIG. 8 is a fragmentary transverse sectional view, enlarged, similar to that of FIG. 6 but illustrating a modification of the invention wherein there is provided a combined bearing means and cover member associated with the coupling roller.

Referring first to FIGS. 4 and 5, the housing of the intra-lens shutter is indicated by the numeral 1, said housing being of the usual type having a shallow, cup-like configuration. On the outer periphery of the side wall 2 of the housing there is provided a speed setting ring 4 having a cylindrical mantle 3 overlapping a portion of the housing side wall. The ring 4 and mantle 3 thereof are mounted for turning about the housing 1 and are held against axial shifting by means of the usual front plate 5, said plate being held in place by a threaded ring 6 (FIG. 2) which is screwed on the front nozzle 7 of a well-known base plate not shown herein in detail. To facilitate adjustment of the speed setting ring 4 the outer periphery thereof is provided with knurling 8, in the well known manner.

The housing 1 has a bottom wall 9, provided with a rear angular shoulder 11, beyond which a rear nozzle 10 extends. The annular shoulder 11 constitutes a bearing for pivotally mounting a diaphragm setting ring 12, said ring being secured against axial shifting in any suitable manner. The diaphragm setting ring 12 also has a cylindrical mantle 13 overlapping the side wall 2 of the shutter housing 1, and also overlapping a portion of the cylindrical mantle 3 of the speed setting ring 4. On the cylindrical mantles 3 and 13 of the setting rings 4 and 12 respectively, in suitable annular grooves or notches 14, scale bands 15 and 16 are disposed, provided with diaphragm and speed scales having spaced graduations and indicia which are cooperable with a fixed index mark 17 fixedly mounted on the camera.

In accordance with the present invention, the outside circumference of the cylindrical mantle 3 of the speed setting ring 4, which mantle has the smaller diameter and is termed herein the "inner mantle," is provided with fine gear teeth or threads 18, said teeth being adapted to mesh with cooperable teeth or worm threads 23 on a coupling roller 19 which is carried by the cylindrical mantle 13 of the diaphragm setting ring 12. The coupling roller 19 is arranged so that its axis extends generally in a circumferential direction with respect to the mantle 13, said roller being shiftable between two stop-positions or limits and being so arranged that the teeth or threads 23 thereof may be readily engaged with or disengaged from the gear teeth or threads 18 on the mantle 3. Referring to FIGS. 1, 4, 5 and 7, the teeth or threads 23 on the coupling roller 19 are seen to extend along a portion only of the circumference of the roller.

For the purpose of obtaining a large number of speed-diaphragm ratios i.e. a large number of different relative coupled positions of the speed and diaphragm setting members, the threads or teeth 18 on the speed setting ring and the meshing threads or teeth 23 on the coupling roller are made to be very fine so that the number of coupled positions of the setting rings between any two adjoining graduations or values will be more than just two or three. That is, each scale interval between two adjoining values may be subdivided into more than two or three subdivisions, each such subdivision representing one relative coupled position of the setting rings. By such fine subdivision of the scale intervals or spaces between adjoining values and graduations there results an outstanding advantage in that, for all practical purposes, an exact speed-diaphragm proportion may be obtained to satisfy all exposure values which are read from the exposure meter.

To accommodate the coupling roller 19 the cylindrical mantle 13 of the diaphragm setting ring 12 is provided with a recess 20, FIGS. 1 and 6, which is disposed within the range of the gear teeth or threads 18 of the speed setting ring 4. On both sides of the recess 20, two radially directed bearing blocks 21 are mounted, said blocks having bearing bores 22 to provide for rotatably mounting the coupling roller 19.

By the above construction there is obtained a simple and advantageous coupling device between the speed and diaphragm setting rings which is characterized by relatively few components of simple and inexpensive construction.

For the purpose of effecting a secure and positive engagement between the gear teeth 23 of the coupling roller 19 and the gear teeth or threads 18 provided on the cylindrical mantle 3, as illustrated herein in FIGS. 4, 5 and 7, the axis of turning of the coupling roller 19 is disposed eccentrically with respect to the circumference of the roller. That is, as seen in FIG. 7, the spindle 24 of the roller is disposed at a distance X from the center of the roller or center of curvature of the circumference on which the threads 23 are provided. By forming the fine threads 23 to have relatively little pitch the engagement and meshing of such threads with the threads or teeth 18 is facilitated and made easy.

The eccentric disposition of the spindle 24 for the coupling roller 19 further provides essential manufacturing advantages, especially with regard to serial mass production of the rollers and the coupling device, since close tolerances are not required between the roller and the coaxially mounted setting rings.

As illustrated in FIGS. 1, 4, 5 and 7, only a portion of the circumference of the coupling roller 19 is provided with the fine threads 23, and the remainder of the circumference is constituted as a knurled rim 44, to facilitate the actuation of the roller. The said remainder of the circumference has a greater axial length than the portion having the threads 23 and also the portion immediately surrounding the spindle 24, whereby the knurled circumference overlies the edges of the bearing blocks 21 to constitute a pair of stops 25 which determines the limits of movement of the coupling roller. One such stop, as illustrated in FIG. 4, defines the uncoupled position of the roller 19, whereas the other stop defines the coupled position of the roller, this latter being illustrated in FIG. 5 The said stops, being constituted by the knurled circumferential portion of the roller 19, thereby prevent the latter from turning beyond the said limits. Even if appreciable force is employed when turning the coupling roller 19, the stops constituted by the axially extended knurled circumferential portion of the roller effectively halt the latter and prevent any possibility of deformation or damage to the setting rings 4 and 12.

Considering the eccentric construction of the coupling roller 19 and the eccentric disposition of the fine threads 23 thereof, the stop which defines the fully coupled position of the roller is so arranged that almost all play between the threads 23 and 18 is eliminated. Thus, no appreciable relative movement is possible between the speed and diaphragm setting rings when these are coupled by means of the coupling roller 19, and this is an important feature of the invention.

For the purpose of preventing dust and dirt from entering the shutter housing at the point where the coupling roller 19 is located, the bearing means for said roller is enclosed by a cover member 26 which is carried by the cylindrical mantle 13, said cover member being provided with a recess 27 preferably conforming closely to the dimensions and shape of the roller 19. A knurled rim 28 is provided on the exterior surface of the cover member 26, to facilitate the setting of the diaphragm ring 12 and also the actuation of the coupling roller 19.

In accordance with the invention, the coupling roller 19 is provided with a notch or yieldable detent device to prevent it from being accidentally shifted out of its limiting positions. The said detent device, FIG. 6, may be constituted in a simple manner as a pin or plunger 29 acted on by a spring 34 contained in a suitable eccentrically located bore in the roller. The pin 29 may be received in either of a pair of depressions or notches 30 provided in one of the bearing blocks 21, as seen in FIGS. 4, 5 and 6.

Operation of the present improved coupling device of the invention, as illustrated in FIGS. 1 to 6, is as follows:

After both of the setting rings 4 and 12 for speed and diaphargm have been individually adjusted to the speed-diaphragm values indicated by the exposure meter, the setting rings are coupled to each other. This is effected by turning the coupling roller 19 clockwise, as viewed in FIGS. 4 and 5, from the FIG. 4 position to the FIG. 5 position. The turning of the roller 19 from the position of FIG. 4, will, of course, be accompanied by a yielding, retracting movement of the detent pin 29, as permitted by the biasing spring 34, as will be understood. During such turning of the coupling roller 19 from the FIG. 4 position to the FIG. 5 position the fine threads 23 on the roller will be made to fully mesh with the threads or teeth 18 on the cylindrical mantle 3. By such action the roller 19 is connected in a positive manner to the mantle 3, and at the time that the roller reaches the position of FIG. 5, as determined by the axially projecting knurled portion of the roller engaging the bearing blocks 21, virtually no play will exist between the meshing threads, preventing all relative movement between the setting rings. Now both setting rings may be shifted simultaneously while the speed diaphragm proportion which has been established will be securely maintained.

The structure provided by the invention, as above set forth, results in a number of important advantages. For one thing, it is possible to obtain a large number of different relative coupled positions of the speed and diaphragm setting members whereby an exact speed-diaphragm value may be obtained to correspond to all exposure requirements as indicated by the exposure meter. In addition, the coupling device is saving of space, is very easily operated, and is characterized by reliability and effectiveness. Moreover, the present coupling device will remain in either its coupled or uncoupled end positions without requiring continual pressure or force on the part of the operator and this feature is had without increasing to any appreciable extent the cost of manufacture of the device.

Another embodiment of the invention is illustrated in FIG. 8, wherein a different kind of supporting means is provided for the coupling roller 19.

Whereas in the first described embodiment of the invention the roller 19 is carried by bearing blocks 21 which are fixedly mounted on the circumference of the cylindrical mantle 13, in the modification shown in FIG. 8 the spindle 24 of the roller 19 is made to directly engage a cover member 31 which is carried by the cylindrical mantle 13. Axial shifting movement of the roller 13 will be prevented by virtue of the roller closely fitting within the recess 32 provided in the cover member 31, and the roller 19 is held against transverse shifting by means of loosely contained inserts or spacer members 33 engaging the spindle 24 and also the cylindrical mantle 13.

The cover member 31 may be secured to the cylindrical mantle 13 by flat head screws 35 recessed in the mantle, as clearly shown in FIG. 8, and such securing means may also be employed with the cover member 26 described in connection with the preceding embodiment of the invention.

It will now be understood that the embodiment shown in FIG. 8 is advantageous from the standpoint of saving time and work in assembly of the components making up the coupling device.

Variations and modifications may be made within the scope of the claims, and portions of the improvements may be used without others.

What is claimed is:

1. In a photographic intra-lens shutter, coaxially-arranged diaphragm and speed setting rings having overlapping inner and outer cylindrical mantles, the said inner mantle having external gear teeth disposed within the inner surface of the outer mantle and closely spaced with respect thereto; a coupling roller turnably carried by the outer mantle and exposed exteriorly thereof, said roller being movable thereon between two predetermined limits, said roller having its axis extending generally circumferentially of the mantle and having worm threads on part of its outer circumference, the remainder of the outer circumference of said roller being knurled and having greater axial length than that portion of the outer circumference having the threads thereon, the outer ends of the knurled portion extending outwardly of that portion having the threads thereon, and forming on said roller a pair of stops which control the movement of said roller between said limits, the worm threads on said roller being adapted to mesh with the teeth of the inner mantle, said roller being shiftable to cause engagement and disengagement between the said gear teeth and worm threads, turning of the roller when the threads and teeth are engaged effecting a fine adjustment between the said rings and the said engagement locking the rings against relative movement and a spring biased plunger mounted in one end of said roller for releasably holding the roller at either of said limits.

2. The invention as defined in claim 1 in which the setting ring having the outer mantle has two radially extended bearing blocks affixed to it, said blocks having bores and said roller having parts extending into said bores to support the roller on the blocks.

3. The invention as defined in claim 2 in which there is a cover member carried by the said outer mantle, having a recess accommodating the roller, said cover member covering the bearing blocks and having an outer surface provided with knurling and said roller being accessible from the exterior of the cover member.

4. The invention as defined in claim 1 in which there is a mounting part for the roller, said part being carried by the setting ring which has the outer mantle and being provided with a recess accommodating the roller, said mounting part having an outer surface provided with knurling and said roller being accessible from the exterior of the mounting part.

5. The invention as defined in claim 1 in which the worm threads of the roller extend in a direction circumferentially of the roller and in a manner to be eccentric with the roller axis.

References Cited in the file of this patent

UNITED STATES PATENTS 2,596,328   Dorsey _____ May 13, 1952

FOREIGN PATENTS 860,167   France _____ Jan. 8, 1941